United States Patent [19]

Johnson

[11] Patent Number: 4,921,930

[45] Date of Patent: May 1, 1990

[54] ACRYLOYLOXY AND METHACRYLOYLOXY GROUP-CONTAINING CONDENSATION POLYMERS

[75] Inventor: Gilbert C. Johnson, Lino Lakes, Minn.

[73] Assignee: Minnesota Mining and Manufacturing Company, St. Paul, Minn.

[21] Appl. No.: 411,543

[22] Filed: Sep. 22, 1989

Related U.S. Application Data

[62] Division of Ser. No. 99,612, Sep. 22, 1987.

[51] Int. Cl.$^5$ .................... C08G 63/52; C08G 63/56; C08G 18/67
[52] U.S. Cl. ..................... 528/306; 528/75; 528/303
[58] Field of Search .................. 528/303, 306, 272

[56] References Cited

U.S. PATENT DOCUMENTS

| 3,210,327 | 10/1965 | Gallane et al. | 526/320 |
| 3,267,084 | 8/1966 | Rankin et al. | 525/340 |
| 3,271,377 | 9/1966 | Mantell et al. | 525/308 |
| 3,373,221 | 3/1968 | May | 528/86 |
| 3,966,681 | 6/1976 | Maeda et al. | 528/297 |
| 3,991,024 | 11/1976 | Nakamoto et al. | 260/18 |
| 4,162,274 | 7/1979 | Rosenkranz | 528/75 |
| 4,295,947 | 10/1981 | Ohtani et al. | 204/159.15 |
| 4,314,922 | 2/1982 | Lehner et al. | 528/75 |
| 4,328,282 | 5/1982 | Lehner et al. | 428/425.9 |
| 4,334,034 | 6/1982 | Lehner et al. | 525/28 |
| 4,358,477 | 11/1982 | Noomen et al. | 427/54.1 |
| 4,366,301 | 12/1982 | Le Roy et al. | 528/66 |
| 4,367,302 | 1/1983 | Le Roy et al. | 524/104 |
| 4,436,570 | 3/1984 | Neuhaus et al. | 156/273.3 |
| 4,578,504 | 3/1986 | Hammar | 560/112 |

FOREIGN PATENT DOCUMENTS

| 0040151 | 11/1981 | European Pat. Off. |
| 28480 | 8/1978 | Japan. |
| 86925 | 7/1981 | Japan. |
| 139521 | 10/1981 | Japan. |
| 4615 | 1/1984 | Japan. |

Primary Examiner—John Kight, III
Assistant Examiner—Dennis R. Daley
Attorney, Agent, or Firm—Donald M. Sell; Walter N. Kirn; Lorraine R. Sherman

[57] ABSTRACT

Organic solvent soluble, acryloyloxy and methacryloyloxy group-containing, condensation polymers are crosslinkable and useful for providing chemical, solvent, and abrasion resistant articles. The condensation polymers are polyesters or polyurethanes having an acryloyloxy or methacryloyloxyalkanediol component that is uncontaminated by hydroxyl group-containing compounds having one, three, or more hydroxyl groups or compounds in which the acryloyloxy or methacryloyloxy group is attached to a secondary carbon atom.

18 Claims, No Drawings

ACRYLOYLOXY AND METHACRYLOYLOXY GROUP-CONTAINING CONDENSATION POLYMERS

This is a division of application Ser. No. 07/099,612 filed Sept. 22, 1987.

FIELD OF THE INVENTION

This invention relates to linear ethylenically-unsaturated condensation polymers prepared from certain diols having pendent acrylate or methacrylate groups that are uncontaminated by monols, triols, and polyols and compounds in which the unsaturated group is attached to a secondary carbon atom. The invention specifically relates to condensation polymers containing acrylate and methacrylate groups which can provide products that can be embossed or polished and then cured to become chemically and abrasion resistant and to a process for preparing the acryloyloxy and methacryloyloxy group condensation polymers.

BACKGROUND ART

Acryloyloxy and methacryloyloxy group-containing condensation polymers are known. U.S. Pat. Nos. 3,373,221, 3,966,681, 4,162,274, 4,295,947, 4,314,922, 4,328,282 and 4,334,034 disclose acryloyloxy and methacryloyloxy group-containing polyurethanes that are the reaction products of diisocyanates and acryloyloxy and methacryloyloxy group-containing diols that are prepared by the reaction of a polyepoxide and acrylic or methacrylic acid. Such acryloyloxy and methacryloyloxy group-containing polyols have their hydroxyl groups located on secondary carbon atoms, introducing undesirable characteristics into polyurethanes prepared from them. Furthermore, acryloyloxy and methacryloyloxy group-containing polyols prepared from polyepoxides introduce a significant amount of residue from the body of the polyepoxide into polyurethanes prepared from them.

U.S. Pat. Nos. 3,210,327, 3,267,084, and 3,271,377 disclose monoacrylic and monomethacrylic esters of alkanediols having the formula

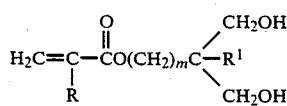

wherein R is hydrogen or lower alkyl group, $R^1$ is a lower alkyl group having 1 to 4 carbon atoms or hydrogen, and m is an integer of 1 to 4, inclusive. These esters are prepared by the hydrolysis of the corresponding ketal.

U.S. Pat. No. 4,578,504 discloses ethylenically-unsaturated diols having the formulae:

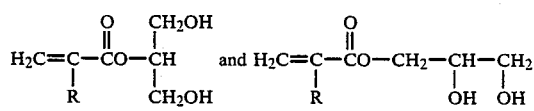

wherein R is hydrogen or methyl. These esters are disclosed as useful in preparation of hydrogel coatings. There is no disclosure of their use in the preparation of acryloyloxy and methacryloyloxy group containing polyurethanes or polyesters.

U.S. Pat. Nos. 4,366,301 and 4,367,302 disclose acryloyloxy and methacryloyloxy group-containing polyurethanes prepared from an organic diisocyanate, a saturated linear diol, a diol having a molecular weight of less than 300, and an unsaturated diol having the formula

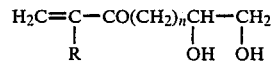

wherein R is methyl or hydrogen and n is an integer between 1 and 4. The unsatured diol used in preparing these polyurethanes has one hydroxyl group located on a secondary carbon atom. Such secondary hydroxy groups are often sluggish in condensation reactions and may lead to polyurethanes having undesirable characteristics.

Thus, acryloyloxy and methacryloyloxy group condensation polymers described in the prior art have been prepared from deficient acryloyloxy and methacryloyloxy group-containing diols that are contaminated by hydroxyl group-containing compounds having one and three or more hydroxyl groups, diols that have hydroxyl groups on secondary carbon atoms, or diols in which the acryloyloxy and methacryloyloxy group is attached to a secondary carbon atom. The use of such deficient diols in condensation polymers considerably restricts possible processing methods and hence the possible use.

SUMMARY OF THE INVENTION

Briefly, the present invention provides crosslinkable linear acryloyloxy and methacryloyloxy group-containing thermoplastic condensation polymers that are soluble in common organic solvents The condensation polymers of the invention comprise polyesters or polyurethanes that are the reaction products of dicarboxylic acids and diisocyanates with acryloyloxy- or methacryloyloxyalkanediols, which diols are uncontaminated by hydroxyl group-containing compounds having one and three or more hydroxyl groups or acryloyloxy and methacryloyloxy group-containing diols and compounds in which the acryloyloxy and methacryloyloxy group is attached to a secondary carbon atom. Depending on the ratio of diols to diisocyanates or dicarboxylic acids (or halides or esters) used in the condensation reaction, the end groups of the condensation polymers can be hydroxyl, carboxyl, or isocyanate The solvent-soluble crosslinkable condensation polymers of the invention are represented by the general formula:

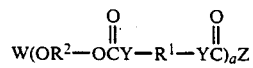    I wherein W and Z are terminal groups;

$R^1$ is one or a mixture of two or more divalent organic groups that is the residue provided by removal of two carboxyl or NCO groups from an organic dicarboxylic acid or organic diisocyanate, respectively, and is selected from linear, branched, and cyclic divalent aliphatic groups having 2 to 40 carbon atoms and divalent aromatic groups having 5 to 24 carbon atoms, $R^1$ being unsubstituted or substituted by non-interfering groups selected from individual catenated —O—,

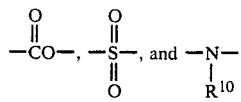

group ($R^{10}$ being a lower alkyl group of 1 to 4 carbon atoms);

Y is a covalent bond when $R^1$ is the residue of an organic dicarboxylic acid and is —NH— when $R^1$ is the residue of organic diisocyanate; preferably, when Y is a covalent bond, then W is H— or

and

Z is —OH or —O—$R^2$—OH and preferably when Y is —NH—, then

W is H— or

and

Z is

or —O—$R^2$—OH; and a is a number of about 2 to 200, preferably such that the number average molecular weight of the polymer is from about 500 to 50,000 or more; and $R^2$ is one or more divalent organic groups selected from the saturated and unsaturated residues provided by removal of two hydroxyl groups from polymeric diols including polyetherdiols, polyesterdiols (the esters being carboxylic acid esters), polyolefindiols, polyamidediols, polyurethanediols, and polysiloxanediols having a molecular weight of up to about 15,000, and monomeric diols including linear, branched, and cyclic aliphatic diols having 2 to 12 carbon atoms and aryl and alkaryl diols having 6 to 15 carbon atoms, and ester substituted 1,3-propanediols represented by the formula:

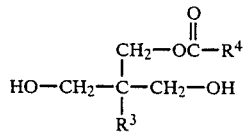

in which $R^3$ is hydrogen or a lower alkyl group having 1 to 4 carbon atoms, or

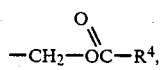

$R^4$ is hydrogen or one or more of monovalent saturated or unsaturated linear, branched, or cyclic aliphatic groups having 1 to 24 carbon atoms, or aromatic groups having 6 to 18 carbon atoms, all of which can be optionally substituted by groups unreactive in esterification reactions such as chlorine, bromine, fluorine or ether oxygen, provided that 5 to 100 weight percent of $R^2$ (Formula I) is

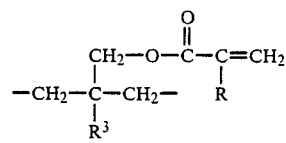

wherein R is hydrogen or methyl, and $R^3$ is as previously defined.

The invention also provides a process for the preparation of crosslinkable, acryloyloxy- and methacryloyloxyalkyl pendent group-containing thermoplastic condensation polymers comprising the steps of:

(a) providing a polymerizable mixture of
(1) one or more diols of which 5 to 100 percent by weight are ester substituted 1,3-propane diols represented by the formula:

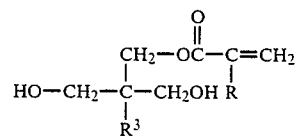

in which R and $R^3$ are as defined above; and
(2) 0.5 to 2.0 moles per mole of (1) of one or more of organic dicarboxylic acid halides and diisocyanates in which the organic residue (by removal of carbonyl halide or NCO groups, respectively) of the dicarboxylic acid halide and diisocyanate is selected from saturated and unsaturated linear, branched, and cyclic aliphatic divalent groups having 2 to 40 carbon atoms and aromatic divalent group having 5 to 24 carbon atoms, all of these groups being unsubstituted or substituted by noninterfering groups selected from individual catenated —O—,

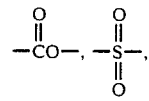

and

groups ($R^{10}$ being a lower alkyl group of 1 to 4 carbon atoms); and (b) heating the polymerization mixture for a time and at a temperature sufficient to effect polymerization, preferably in the presence of a catalyst.

The organic solvent soluble, crosslinkable, condensation polymers of the invention are useful in many applications because of the high concentration of acrylate or methacrylate groups that can be present. High concentration of these groups enables rapid crosslinking of the polymer under the influence of free radicals. Solutions of the polymers can be applied to supports to form coatings that are hard and thermoplastic. The coatings can be embossed with various patterns such as decorative or information bearing patterns as are present in video discs and then cured to dimensionally stable articles. The solutions can be applied to various substrates, e.g., wood, metal, plastic, or ceramic, to form coats that can then be shaped, ground, or polished and finally cured to chemical, solvent, and abrasion resistant coats. Other applications in which the polymers are useful include adhesives, caulking and sealing compositions, elastomers, foams, casting and molding compositions, impregnating compositions, and binders.

Because of the absence of monohydroxyl, tri, and higher hydroxyl groups-containing compounds, high molecular weight condensation polymers can be made by the process of the invention. There is no termination of reacting chains to cause low molecular weights as is caused by monohydroxy group-containing compounds, nor is there crosslinking of polymer chains caused by tri and higher hydroxy group-containing compounds.

In this application: "individual catenated groups" means groups which are not directly linked to each other but are, rather, interspersed throughout the carbon chain.

DETAILED DESCRIPTION OF THE INVENTION

The crosslinkable condensation polymers of the invention (Formula I) are prepared by the reaction, according to conventional procedures, of one or more organic dicarboxylic acid halides or one or more organic diisocyanates with organic diols of which at least 5% by weight are acrylic or methacrylic ester substituted-1,3-propanediols, these diols being uncontaminated by monols, triols, or higher polyols, to form the solvent-soluble crosslinkable acryloyloxy and methacryloyloxy group-containing polyesters and polyurethanes, respectively.

The condensation polymer can be a polymer in which the acrylic or methacrylic ester unit is located randomly along its chain or the condensation polymer can be a block polymer having one or more of the polyester and polyurethane segments having acrylic or methacrylic units, and optionally one or more of polyether, polyester, polyolefin, polysiloxane, and the like segments, each segment having a molecular weight of up to 15,000 or more, the acrylic or methacrylic ester unit being present in one or more of the polyester and polyurethane segments.

Organic dicarboxylic acid halides that can be used in the condensation polymers of the invention can be selected from saturated and unsaturated linear, branched, and cyclic aliphatic and aromatic dicarboxylic acid halides that may be substituted by non-interfering groups such as alkyl, ether oxygen, tertiary amino, ester, halo, and amido groups. Examples of such acid halides include the diacid chlorides and diacid bromides of succinic, glutaric, adipic, suberic, sebacic, undecanedicarboxylic, hexadecanedicarboxylic acids and the dimerized fatty acids (such as obtained by the dimerization of olefinically-unsaturated monocarboxylic acids containing 16 to 20 carbon atoms such as oleic acid, linoleic acid and the like). Other useful acid halides include the diacid chlorides and bromides of diglycolic, dilactic, 3,3'-(ethylenedioxy)-dipropionic, phthalic, isophthalic, terephthalic, 3-chloro-1,2-benzenedicarboxylic, tetrafluorophthalic, 5-sulfoisophthalic, 4-methoxycarbonyl-1,2-benzenedicarboxylic, diphenic, maleic, fumaric, itaconic, phenylenediacetic, benzylsuccinic, 1,4-naphthalenedicarboxylic, 5-chloro-1,3-benzenedicarboxylic, tetrachlorophthalic, 1,2-cyclohexanedicarboxylic, 2,5 tetrahydrofuranedicarboxylic, 1,5-pent-2-enedioic, 2-methyleneglutaric, 2-methyleneadipic, 3-methylitaconic, 3,3-dimethylitaconic, 5-dimethylaminocarbonyl-1,3-benzenedicarboxylic acids and mixtures thereof.

Diisocyanates that can be used in the preparation of the crosslinkable condensation polymers are well known and include any of the linear, branched, and cyclic aliphatic, aromatic and heterocyclic diisocyanates known in the polyurethane field Examples of preferred diiocyanates include 2,4-tolylene diisocyanate, 3,5,5-trimethyl-1-isocyanato-3-isocyanatomethylcyclohexane, bis-(4-isocyanatophenyl)methane, bis-(4-isocyanatocyclohexyl)methane, hexamethylene diisocyanate, 1,3-di(isocyanatoethyl)hydantoin, trimethylhexamethylene diisocyanate, and meta and para-tetramethylxylylene diisocyanate.

Diols that can be used in the preparation of the polyesters of the invention in addition to the required ester substituted 1,3-propanediols have a number average molecular weight of 62 to about 15,000 and include saturated and unsaturated monomeric and polymeric diols. Examples of monomeric diols include straight or branched chain alkylenediols having the formula $HO(CH_2)_eOH$ in which e is an integer 2 to 10 and oxaalkylenediols having a formula $H(OR^5)_fOH$ in which $R^5$ is an alkylene group having 2 to 4 carbon atoms and f is a number having a value of 2 to 4. Examples include ethyleneglycol, propyleneglycol 1,4-butanediol, 1,4-butenediol, neopentylglycol, 1,6-hexanediol, 2,2-dimethyl-1,3-propanediol, diethyleneglycol, 1,11-(3,6-dioxa)undecanediol, and the like. Examples of polymeric diols include poly(oxyalkylene)diols such as the Carbowax ® diols available from Union Carbide, the poly(oxytetramethylene)diols such as Polymeg ® diols available from Quaker Oats Company, and Terathane ™ diols from duPont, the polyester diols such as the Multron ® poly(ethylene adipate)diols available from Mobay Chemical Co., the polycaprolactone diols such as the TONE ™ diols available from Union Carbide, the polyolefin diols such as the polyethylenediols available from Sartomer Co. and polybutadienediols available from Arco Chemical Co., and the polysiloxandediols such as those described in U.S. Pat. No. 3,886,865 but preferably those described in U.S. Pat. No. 4,013,698, and the sulfonated diols described in U.S. Pat. Nos. 4,307,219 and 4,558,149.

The above described substituted 1,3-propanediol esters of formula II, which are uncontaminated by hydroxyl compounds having one, three or more hydroxyl group-containing compounds and compounds in which the acryloyloxy and methacryloyloxy group is attached to a secondary carbon atom, are prepared in a manner analogous to the procedure disclosed in Assignee's copending U.S. patent application Ser. No. 07,099,565, now abandoned filed the same date as this application, for the preparation of 2,2-bis(hydroxymethyl)-1,3-propanediol esters and mixtures of esters by the steps of:

(a) esterifying a mono or diorganic group-substituted 5-hydroxymethyl-1,3-dioxane represented by the formula:

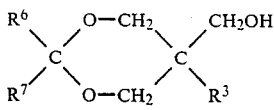   V wherein
R$^3$ is defined above,
R$^6$ is a lower alkyl group of 1 to 6 carbon atoms or phenyl, optionally substituted by a non-interfering group or atom, as for example, halo, or the methyl, methoxy or dimethylamino group, and
R$^7$ is independently the same as or different R$^6$ or hydrogen,
with aliphatic carbonyl compounds represented by the formula:

   VI wherein
R$^4$ is defined above and
X is hydroxyl, halogen, alkoxy having 1 to 4 carbon atoms or $$-\text{O}\overset{\text{O}}{\underset{\|}{\text{C}}}\text{R}^4,$$

wherein R$^4$ is as defined above, to provide one or a mixture of mono or diorganic group substituted 5,5-bis(hydroxymethyl)-1,3-dioxane esters having the general formula:

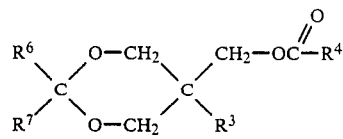   VII wherein R$^3$, R$^4$, R$^6$ and R$^7$ are defined above and
(b) hydrolyzing the dioxane ester or mixture of dioxane esters provided in step a) to provide the 1,3-propane diol ester and mixture of esters of Formula III that are uncontaminated by alcohols having one, three or more hydroxyl groups.

This procedure is summarized in the following FLOW CHART, steps a and b:

FLOW CHART

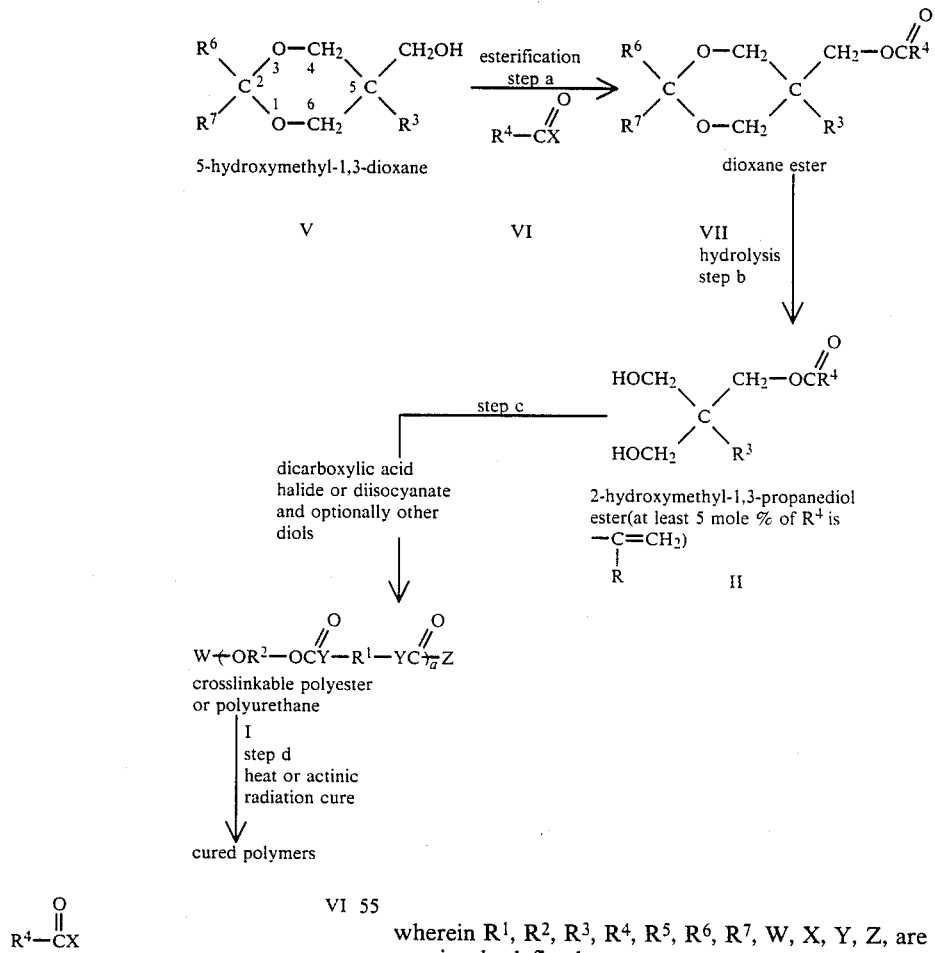

wherein R$^1$, R$^2$, R$^3$, R$^4$, R$^5$, R$^6$, R$^7$, W, X, Y, Z, are as previously defined.

Preferred substituted 1,3-propanediols are:
2,2-bis(acryloyloxymethyl)-1,3-propanediol
2-acryloyloxymethyl-1,3-propanediol
2-acryloyloxymethyl-2-methyl-1,3-propanediol
2-acryloyloxymethyl-2-ethyl-1,3-propanediol
2,2-bis(methacryloyloxymethyl)-1,3-propanediol
2-methacryloyloxymethyl-1,3-propanediol
2-methacryloyloxymethyl-2-methyl-1,3-propanediol
2-methacryloyloxymethyl-2-ethyl-1,3-propanediol Examples of other substituted 1,3-propanediols are:

2-acryloyloxymethyl-2-acetyloxymethyl-1,3-propanediol
2,-methacryloyloxymethyl-2-octadecanoyloxymethyl-1,3-propanediol
2-2-bis(perfluorooctanoyloxymethyl)-1,3propanediol
2-formyloxymethyl-2-methyl-1,3-propanediol
2-acetyloxymethyl-2-ethyl-1,3-propanediol
2-butanoyloxymethyl-2-methyl-1,3-propanediol
2-octadecanoyloxymethyl-2-ethyl-1,3-propanediol The polyesters of Formula I of the invention are prepared (step c) by the reaction of diacid halides or other comparable doubly activated diacid-derivatives with diols of which at least 5 weight percent are acryloyloxy and methacryloyloxy group-containing ester-substituted 1,3-propanediols of Formula II. Since the 1,3-propanediols are readily polymerized through the acryloyloxy and methacryloyloxy group groups, it is preferable that the reaction be carried out at low temperatures, e.g., below 100° C., most preferably below 75° C., and in the presence of a free-radical polymerization inhibitor such as 4-methoxyphenol (MEHQ) and preferably in a solvent. The hydrogen halide evolved in the reaction should be removed rapidly to avoid addition to the acryloyloxy and methacryloyloxy group. Preferably this is done by use of an acid acceptor such as, for example, triethylamine and pyridine. However, inorganic bases such as sodium or potassium hydroxide, carbonate or bicarbonate can be used. Reactive olefinically-unsaturated compounds such as acrylonitrile, can also be used as acid acceptors, provided that they are sufficiently reactive that they compete successfully for the acid halide when compared to the acryloyloxy and methacryloyloxy group monomers and polymers.

It is also preferable that the reaction be carried out in the presence of a stabilizing agent. Useful stabilizers include, but are not limited to, the alkyl and aryl phosphites and substituted and unsubstituted hydroquinones and phenols. From about 0.1 to five percent by weight stabilizer is used.

Polyesters of Formula I of the invention, where Y is a covalent bond, can be prepared as homopolymers and random copolymers or block copolymers, depending on the method of synthesis. The homopolymers and random copolymers are made by treating a diol or mixture of diols with a diacid halide or mixture of diacid halides. Preferably, the diacid halide or mixture of diacid halides is added to a solution of the diols, using 0.5 to 2.0 moles of diacid halides per mole of diol, in a suitable solvent such as dichloromethane or ethyl acetate that contains two or more moles of acid acceptor per mole of diol. During the addition, the reaction mixture is maintained at a temperature of about 20° to 100° C. by cooling means and the addition held at such a rate that the temperature remains within these limits. Generally, the reaction can be completed within 30 minutes to about 10 hours. Following the addition, if present as a solid precipitate, the biproduct salt is removed by filtration, the filter cake is then washed with solvent and the polyester is recovered from the filtrates. The biproduct salt can also be removed by addition of water and is removed in the aqueous phase leaving the solvent phase from which the polyester is recovered.

Block polyesters are made by treating diol or mixture of diols with diacid halide or mixture of diacid halides in molar proportions chosen to have one reagent in excess. Use of 0.5 to less than one moles of diacid halide per mole of diol will generate an intermediate ester diol, and use of greater than one to 2.0 moles of diacid halide per mole of diol will generate an intermediate ester diacid halide. By further treatment of these intermediates with the appropriate reagents, consisting of either or both of a different diol or mixture of diols or a different diacid halide or mixture of diacid halides, block polymers are obtained, as is well known. Preferably the intermediate is prepared using 0.75 to 0.95 moles of diacid halide per mole of diol to generate a polyester diol, which can be reacted further in situ or isolated for use as a polyester block in polyesters or polyurethanes, as is described below.

The polyurethanes of Formula I of the invention are prepared (step c) by the reaction of diisocyanates and diols of which at least 5 weight percent are acryloyloxy and methacryloyloxy group ester-substituted 1,3-propanediols of Formula III. They can be generated as homopolymers, random copolymers, or block polymers through intermediate diol blocks or diisocyanate block. Since the 1,3-propanediols are readily polymerized through the acryloyloxy and methacryloyloxy group groups, it is preferable that the reaction be carried out at low temperatures, e.g. below about 100° C., preferably below 80° C., and in the presence of a free-radical inhibitor of polymerization such as 4-methoxyphenol. Preferably the reaction is carried out in the presence of 0.0001 to 0.5 percent by weight of reaction catalyst such as dibutyltin dilaureate based total weight of reactants. The diols, 0.5 to 2.0 moles of diisocyanates per mole of diols, the polymerization inhibitor, the reaction catalyst and sufficient solvent, such as acetone and ethyl acetate, to provide a solution having about 10 to 75% solids are placed in a reactor equipped with an agitator and reflux condenser and the mixture agitated and heated until analysis indicates disappearance of the reagent used in less than the stoichiometric amount, generally 1 to 100 hours or more, preferably 1 to 10 hours. The polyurethane can then isolated by removal of solvents by addition of the reaction mixture to a nonsolvent such as ethyl ether or by volatilization of the solvent. For many uses, the reaction mixture can be used without removal of solvent.

The molecular weight of the condensation polymers can be controlled by including in the polymerization mixture a monofunctional alcohol, carboxylic acid derivative such as halide, or isocyanate. Examples of such monofunctional compounds include but are not limited to pentanol, hexanol, cyclohexanol, octadecanol, 2-hydroxyethyl acrylate and methacrylate, acetyl chloride, stearoyl chloride, benzoyl chloride, isocyanatobenzene and 1-isocyanato-3- and 4-methylbenzene. As much as 50 mole percent of the stoichiometric amount of hydroxyl, carboxylic, or isocyanato functionality present in the polymerization mixture can be present in monofunctional compounds to control the molecular weight of the condensation polymers; however, 5 to about 25 percent is generally sufficient to provide a desired lowering of molecular weight.

The polyesters and polyurethanes of the invention are thermoplastic and, because of the pendent acrylate or methacrylate groups, articles of various shapes can be molded from compositions containing them and cross-linked to become insoluble and infusible. Generally, a heat activated free-radical initiator is incorporated into the polyester or polyurethane compositions in an amount from about 0.1 to 5.0 percent by weight of total weight of the composition. Examples of heat activated free-radical initiators include but are not limited to benzoyl peroxide, lauroyl peroxide, dicyclohexyl percarbonate, azo-bis(isobutyronitrile) and the like. The free-radical initiated molded article can then be crosslinked (step d) by heating, preferably at a temperature between about 50 and 150°. Radiation activated free-radical initiators can be used in the composition, however they are not preferred when the molded article has a thickness greater than about 5 millimeters.

The polyesters and polyurethanes of the invention are soluble in many organic solvents, e.g. acetone, methyl ethyl ketone, tetrahydrofuran, propyl acetate, from which thermoplastic coatings can be cast and cured to solvent, heat and abrasion resistant coatings. Curing of the coatings can be accomplished by at least one of heat and actinic radiation. Generally, compositions suitable for coatings comprise a solution of from about 5 to 50, perferably 10 to 30, percent by weight of the polyester or polyurethane in a suitable solvent and a heat or a radiation activated polymerization initiator.

The condensation polymers of the invention can also be diluted with ethylenically-unsaturated materials (particularly acrylic acid and derivatives thereof and vinyl compounds) to modify or enhance their properties, e.g., hardness, flexibility, and adhesion to substrates. Both ethylenically-unsaturated low and high molecular weight materials can be used including for example methyl methacrylate, ethyl acrylate, 2-ethylhexyl acrylate, cyclohexyl acrylate, styrene, 2-chlorostyrene, 2,4-dichlorostyrene, acrylic acid, acrylamide, acrylonitrile, t-butyl acrylate, methyl acrylate, butyl acrylate, 2-(N-butylcarbamyl)ethyl methacrylate and 2-(N-ethylcarbamyl)-ethyl methacrylate. Other modifying monomers that can be incorporated into the composition of the invention include 1,4-butylene dimethacrylate or diacrylate, ethylene dimethacrylate, hexanediol diacrylate or dimethacrylate, glyceryl diacrylate or dimethacrylate, glyceryl triacrylate or trimethacrylate, pentaerythritol triacrylate or trimethacrylate, pentaerythritol tetraacrylate or tetramethacrylate, diallyl phthalate, dipentaerythritol pentaacrylate, neopentyl-glycol diacrylate, and 1,3,5-tri(2-methacryloyloxyethyl)-s-triazine. In addition to the reactive monomers, other polymerizable ethylenically-unsaturated coreactants can be blended with the condensation polymers of the invention. Such coreactants include acrylated epoxy, acrylated urethane, and acrylated cellulose oligomers and resins. Generally, up to about one part of modifying materials per part by weight of ethylenically-unsaturated condensation polymer can be used. Also, small amounts of non-reactive film-forming resins, such as nitrocellulose, can be added.

Heat and radiation activators of polymerization are well known. The preferred initiators are the radiation activated initiators. Included among such initiators are acyloin and derivatives thereof, such as benzoin, benzoin methyl ether, benzoin ether ether, benzoin ispropyl ether, benzoin isobutyl ether, and 2-hydroxy-2-methyl-1,2-diphenylethanone; diketones such as benzil and diacetyl; phenones such as acetophenone, 2,2,2-tribromo-1-phenylethanone, 2,2-diethoxyacetophenone, 2,2-dimethoxy-2-phenylacetophenone, 2,2,2-tribromo-1-(2-nitrophenyl)-ethanone, benzophenone, 4,4,-bis(dimethylamino)benzophenone and 1-hydroxycyclohexyl phenyl ketone. Normally, the initiator is used in amounts ranging from about 0.01 to 10% by weight of the total polymerization composition comprising polyester or the polyurethane. When the quantity is less than 0.01% by weight, the polymerization rate becomes extremely low. If the initiator is used in excess of about 10% by weight, no correspondingly improved affect can be expected. Thus, addition of such greater quantity is not economically justified and may detract from the properties of the cured coatings. Preferably, about 0.25 to 5% of initiator is used in the polymerizable composition.

The photopolymerization of the compositions of the invention occurs on exposure of the compositions to any source of radiation emitting actinic radiation at a wavelength within the ultraviolet and visible spectral regions and by infrared radiation, i.e., thermal energy. Suitable sources of radiation include mercury, xenon, carbon arc and tungsten filament lamps and sunlight. Exposures may be from less than about one second to ten minutes or more depending upon the amount of particular polymerizable materials, the photopolymerization catalyst being utilized, the radiation source, the distance of the composition from the source and the thickness of the coating to be cured. The compositions may also be polymerized by exposure to electron beam irradiation. Generally speaking, the dosage necessary is from less than 1 megarad to 30 megarads or more. An advantage of curing with electron beam irradiation is that highly pigmented compositions can be effectively cured at a faster rate than by mere exposure to actinic radiation.

In addition to solvents, catalysts, and the initiators of polymerization the polyester and polyurethane compositions to be cured can also include other materials such as dyes; pigments, e.g., titanium dioxide, clay, calcium carbonate, and zinc chromate; glass and carbon fibers; glass beads and bubbles; organic polymers such as polyesters, polyurethanes, vinyl polymers, cellulose esters; and organic polymer fibers and particles. These additives may be present in quantities up to 500 parts or more per 100 parts polyester or polyurethane by weight and preferably from about 0.01 to about 200 parts on the same basis.

Objects and advantages of this invention are further illustrated by the following examples, but the particular materials and amounts thereof recited in these examples, as well as other conditions and details, should not be construed to unduly limit this invention.

EXAMPLE 1

Illustrating the preparation of a polyurethane condensation polymer

Into a 500 ml 3-neck flask equipped with a mechanical stirrer, gas inlet, thermometer and distilling head were placed 75.2 g 2,2-bis(acryloyloxymethyl)-1,3-propanediol (0.31 moles) prepared as described below
0.05 g 4-methoxyphenol
185 ml ethyl acetate The flask containing the three components was heated to remove by azeotropic distillation traces of water from the equipment and materials. The distillation head was replaced by a reflux condenser equipped with drying tube and a slow stream of dry air introduced below the surface of the solution. There was added to the flask 65.2 g trimethylhexamethylene diisocyanate (0.31 moles)
0.1 ml dibutyltin dilaureate (DBTDL)

The stirrer was activated and the temperature of the mixture was raised to 75° C., and these conditions maintained for 48 hours, after which time infrared absorption of the reaction mixture indicated the disappearance of isocyanate. The mixture was poured, while stirring rapidly, into 500 ml of ether. The white fibrous polyurethane that precipitated had a calculated acrylic ester equivalent weight of 227.

A solution containing 30% by weight of the polymer was prepared and 2% by weight based on dissolved solids of Irgacure TM 184, a photoinitiator available from Ciba-Geigy, was added. The solution was coated using a Meyer TM bar at a dried thickness of about 25 micrometers on 100 micrometer thick polyester film and dried over night. A portion of the dried coating was cured in air and another under nitrogen in a RPC ® UV Processor (Radiation Processing Inc., subsidiary of Sumitomo Heavy Industries Ltd., Tokyo, Japan) having two lamps set on high using two passes at a belt speed of 25 centimeters per second. Abrasion resistance of each was measured by abrading on a Taber Abraser (available from Pacific Scientific Co.) using 30 cycles with CS-17 wheels under a 500 g load and quantified as percent haze (average of several samples) with a Hazegard hazemeter (available from Pacific Scientific Co.). The sample cured in air showed a haze of 3.21 and the sample cured under nitrogen showed a haze of 2.48.

The preparation of 2,2-bis(acryloyloxymethyl)-1,3 propanediol was as follows:

Step (a) esterification of 2-phenyl-5,5-bis-(hydroxymethyl)1,3-dioxane

Into a two-liter reaction flask equipped with an agitator, reflux condenser, and dropping funnel was placed one liter of dichloromethane, 224 g (1.0 mole) of 2-phenyl-5,5-bis(hydroxymethyl)-1,3-dioxane and 222 g (2.2 moles) triethylamine. Into the flask was added dropwise 188 g (2.1 moles) of acryloyl chloride at a rate sufficient to maintain gentle reflux. After the addition was complete, the mixture was stirred for 30 minutes and allowed to cool. The flask was then immersed in ice-water and stirring continued until the flask contents reached a temperature of 5° C. or less. Triethylammonium chloride was filtered and the filtrate washed with cold water and a saturated solution of sodium sulfate. The washed filtrate was dried over anhydrous sodium sulfate and then filtered through silica gel. The solvent was then removed by evaporation under reduced pressure and the crude product, 2-phenyl-5,5-bis-(acryloyloxymethyl)-1,3-dioxane, used in Step b directly or after recrystallization from ethyl acetate (m.p. 65° C.).

The 2-phenyl-5,5-bis(hydroxymethyl)-1,3-dioxane used in Step (a) was obtained by the reaction of benzaldehyde and pentaerythritol according to the procedure described in Org. Synthesis, Col. IV. p. 679 (1963).

Step (b) - hydrolysis of 2-phenyl-5,5-bis(acryloyloxymethyl)-1,3-dioxane

Into a two-liter flask equipped with an agitator, means for steam distillation, and a Claisen head with an efficient condenser was placed 664 g (2 moles) of 2-phenyl-5,5- bis(acryloyloxymethyl)-1,3-dioxane, two grams of 4-methoxyphenol and a hot solution of 8 grams of oxalic acid and 1.6 grams of potassium carbonate in 200 ml water. A slow stream of air was introduced into the steam inlet and the mixture stirred and warmed very slightly until the mixture appeared to be a homogeneous emulsion. Steam was then added to the air stream whereon benzaldehyde began to steam distill. It is desirable during the steam distillation that rapid stirring be maintained to provide intimate contact between the organic and aqueous layers in order to decrease the time required for hydrolysis as much as possible. After benzyaldehyde was no longer distilling, the still residue was cooled, saturated with sodium sulfate, filtered and extracted with ethyl acetate. The combined extracts were dried, preferably, by azeotropic distillation of water and ethyl acetate under reduced pressure. The 2,2-bis(acryloyloxymethyl)-1,3-propanediol obtained was a viscous, hydroscopic liquid. NMR spectroscopy confirmed the fact that no monol or triol was present in the product.

EXAMPLE 2

Illustrating the preparation of a polyurethane using a saturated diol in addition to the unsaturated diol The procedure of Example 1 was followed by first drying by azeotropic distillation a mixture of 75.2 g 2,2-bis(acryloyloxymethyl)-1,3-propanediol (0.31 moles)
32.1 g neopentylglycol (0.31 moles)
0.09 g 4-methoxyphenol
250 ml ethyl acetate and then adding 103.6 g hexamethylene diisocyanate (0.62 moles) 0.12 ml DBTDL.

Heating while stirring the dried mixture was maintained overnight (18 hours) after which infrared absorption of the reaction mixture indicated disappearance of isocyanate. The polyurethane reaction product had a 1:1:2 mole ratio of unsaturated diol, neopentylglycol, and hexamethylene diisocyanate and a calculated acrylic ester equivalent weight of 260.

EXAMPLES 3-11

Various polyurethanes of the invention were prepared and evaluated according to the procedures followed in Examples 1 and 2 using the mole ratios (m) of hydroxymethyl-1,3-propanediol acrylates, other hydroxy compounds and diisocyanates given in Table I.

TABLE I

| Exp. No. | (a) Unsat. Diol(m) | (b) Other Hydroxy Compound(m) | (c) Diiso-Cyanate(m) | (d) IV | (e) Mw | (f) Mn | (g) P | (h) *Abrasion Resistance using 2 wt % photoinitiator In Air | (i) In Nitrogen |
|---|---|---|---|---|---|---|---|---|---|
| 1 | PEDA(1) | — | TMDI(1) | 0.09 | 12200 | 4950 | 2.47 | 3.21 | 2.48 |
| 2 | PEDA(1) | NPG(1) | HDI(2) | 0.41 | 158000 | 25100 | 6.29 | 3.17 | |
| 3 | TMEA(1) | — | HDI(1) | 0.16 | 16100 | 5490 | 2.94 | 3.14 | 2.77 |
| 4 | TMEA(1) | — | TMDI(1) | 0.09 | 9360 | 3730 | 2.51 | 5.31 | 3.67 |
| 5 | TMEA(1) | — | BIM(1) | 0.33 | 64200 | 14900 | 4.32 | 6.26 | 4.63 |
| 6 | TMEA(1) | — | IPDI(1) | 0.07 | 8610 | 3350 | 2.57 | 13.31 | 9.63 |

TABLE I-continued

| Exp. No. | (a) Unsat. Diol(m) | (b) Other Hydroxy Compound(m) | (c) Diiso-Cyanate(m) | (d) IV | (e) Mw | (f) Mn | (g) P | (h) *Abrasion Resistance using 2 wt % photoinitiator In Air | (i) *Abrasion Resistance using 2 wt % photoinitiator In Nitrogen |
|---|---|---|---|---|---|---|---|---|---|
| 7 | TMEA(1) | — | TMXDI(1) | 0.09 | 18300 | 5400 | 3.39 | 16.35 | 12.53 |
| 8 | PEDA(3) | HEA(2) | TMDI(4) | 0.05 | 4390 | 2180 | 2.02 | 3.86 | 2.36 |
| 9 | PEDA(3) | HEA(2) | TMXDI(4) | 0.09 | 6140 | 2670 | 2.30 | 2.94 | 2.46 |
| 10 | PEDA(4) | Tone 210(1) | TDI(5) | 0.19 | 42200 | 9120 | 4.63 | 3.93 | |
| 11 | TMEA(4) | TONE 210(1) | BIM(5) | 0.33 | 18200 | 14000 | 1.25 | 10.29 | |

Notes to Table I

Col. (a) Lists the unsaturated diols used in the example. The number(m) is the relative number of moles of unsaturated diol to other hydroxy compound and diisocyanate used. TMEA is 2-acryloyloxymethyl-2-methyl-1,3-propanediol and PEDA is 2,2-bis(acryloyloxymethyl-1,3-propanediol.

Col. (b) Lists the other hydroxy compounds used. The number (m) is the relative number of moles of other compounds. HEA is 2-hydroxy ethyl acrylate, NPG is neopentyl glycol, and Tone 210 is polycaprolactonediol having molecular weight of 830 (Union Carbide)

Col. (c) Lists the diisocyanates used. The number (m) is the relative number of moles of diisocyanate. HDI is 1,6-hexanediisocyante, TMDI is a mixture of 2,2,4-trimethyl- and 2,4,4-trimethyl-1,6-hexane diisocyanate, BIM is bis(4-isocyanatocyclohexylmethane, IPDI is isophorone diisocyanate, TMXDI is tetramethyl-m-xylene diisocyanate and TDI is 2,4-diisocyanatotoluene Col. (d) Inherent viscosity of 1% solutions is 50/50 methyl ethyl ketone/ethanol by volume.

Col. (e) Weight average molecular weight determined by GPC.

Col. (f) Number average molecular weight determined by GPC.

Col. (g) Polydispersity determined by GPC.

Col. (h) Abrasion resistance of samples cured in air using 2% Irgacure 184.

Col. (i) Abrasion resistance of samples cured under nitrogen using 2% Irgacure 184.

*The lower the abrasion resistant value (% haze after abrasion), the greater the property is exhibited The data of Table I show the polymers of the invention provide abrasion resistant coatings when cured both in air and under nitrogen.

EXAMPLE 12

Exemplifying the preparation of a polyester condensation polymer.

A 3 liter resin flask was equipped with a 3-neck head, mechanical stirring, reflux condenser, and additional funnel. The addition funnel was charged with a solution of:
219.5 g vacuum distilled terephthaloyl chloride (1.08 mole)
500 ml dichloromethane The flask was charged with:
188.5 g 2-methyl-2-acryloyloxymethyl-1,3-propanediol (1.08 mole)
240.8 triethylamine (2.38 moles)
0.50 g 2,6-di(tert)butyl-4-methylphonel
1.5 l dichloromethane Addition of the diacid chloride solution was set at a rate to maintain gentle reflux of the reaction mixture. Addition took about one hour, and gentle heating maintained reflux for thirty minutes after addition was completed. The flask was then cooled in an ice bath until the solution was at 5° C. or less. Precipitated triethylammonium chloride was removed by filtration, and the filtrate washed 3 times with 1 liter portions of water, dried over anhydrous sodium sulfate, and filtered through silica gel. The filtrate was concentrated to a volume of about one liter and polymer precipitated by slowly pouring the dichloromethane solution into 2 liters of rapidly stirred methanol. The supernatant liquid was separated from the very viscous precipitate, which was dissolved in a minimum of dichloromethane. The dichloromethane solution could be dried down to yield a clear, tack free polymer that had an IV of 0.054, a weight average molecular weight (Mw) of 5130, a number average molecular weight (Mn) of 3430, and a polydispersivity (P) of 1.5. When coated onto polyester film and cured in air as described in Example 1, the abrasion resistance value was 4.7% haze after abrasion.

EXAMPLE 13

Exemplifying the preparation of a polyester diol

A 3 liter resin flask was equipped with a 3-neck head, mechanical stirring, reflux condenser, and addition funnel. The addition funnel was charged with a solution of:
164.7 g vacuum distilled adipoyl chloride (0.9 mole)
400 ml dichloromethane The flask was charged with:
174.2 g 2-methyl-2-acryloyloxymethyl-1,3-propanediol (1.0 mole)
202.4 g triethylamine (2.0 moles)
0.25 g 2,6-di(tert)butyl-4-methylphenol
1.5 l dichloromethane Addition of the diacid chloride solution was set at a rate to maintain gentle reflux of the reaction mixture. Addition took about forty minutes, and gentle hearing maintained reflux for thirty minutes after addition was complete. The flask was then cooled in an ice bath until the solution was at 5° C. or less. Precipitated triethylammonium chloride was removed by filtration, and the filtrate washed 3 times with 1 liter portions of water, dried over anhydrous sodium sulfate, and filtered through silica gel. The bulk of the solvent was removed on a rotary evaporator, and the last traces were removed by passing a slow stream of dry air through the viscous product. The diol so obtained was a viscous liquid with a molecular weight, Mn, calculated from the stoichiometry as 2733.

EXAMPLE 14

Exemplifying the preparation of a block polyester-polyurethane

A 1 liter 3-neck flask equipped with mechanical stirring, a dry air inlet tube, and a distillation head, was charged with:
170.7 g of the diol of Ex. 13, 0.125 eq. OH (calc.)
0.25 g 2,6-ditertiarybutyl-4-methylphenol (BHT)
500 ml ethyl acetate A slow flow of dry air was introduced below the surface of the reaction, and 100 milliliters of ethyl acetate were distilled to dry the flask and reagents, the solution was cooled to 65° C., and the distillation head was replaced with a reflux condenser.

The reaction was then charged with:
69.3 g isophorone diisocyanate, 0.625 eq. NCO
0.2 ml dibutyltin dilaurate (catalyst)
0.05 ml methanesulfonic acid (isocyanate The solution was reheated to gentle reflux for 5 hours in order to endcap the diol with the diisocyanate, then the reaction was charged with:
22.53 g 1,4-butanediol, 0.50 eq. OH After an additional 7 hours, an infrared spectrum indicated that the isocyanate absorption was greatly reduced, but not absent, so an additional charge of chain extender was added:
1.46 g 1,4-butanediol, 0.032 eq. OH The heating was continued for an additional 10 hours, at which time an infrared spectrum indicated the absence of isocyanate. The cooled polymer solution was poured into two liters of stirred hexanes to precipitate the polymer. After decanting the solvents from the precipitation, the product was a very viscous material retaining about 20% solvent. It was dissolved in a minimum of dichloromethane in order to handle it. The solution obtained could be dried to a clear, rubbery film. The polymer had an IV of 0.064, Mw of 3940, Mn of 1950, and P of 2.02. When coated onto polyester film and cured in air as described in Example 1, the result was a hard non-rubbery coating with an abrasion resistance value of 12.11% haze after abrasion.

EXAMPLE 15

Exemplifying the use of a polyacrylated polyurethane/urethane-acrylate oligomer blend A solution of 7.5 g of the polyacrylated polyurethane of Example 1 and 7.5 g of the urethane acrylate oligomer Gafgard CD TM 238 (a polyester diol endcapped with diisocyanate and hydroxyethyl acrylate to yield a polymeric diacrylate available from GAF) was prepared in 35 g ethyl acetate (30% solids), 0.3 g of the photoinitiator Irgacure TM 184 (Ciba-Geigy) was added, and the blend coated, radiation cured in air, and evaluated as described in Example 1. The abrasion resistance value of the cured blend was 6.58% haze after abrasion.

EXAMPLE 16

Exemplifying the use of a polyacrylated oligomer/polyacrylated polymer blend

A solution of 7.5 g of the polyacrylated polyurethane oligomer of Example 8 and 7.5 g of the acrylated cellulosic polymer FX 911, available from 3M's Protective Chemical Division and described in U.S. Pat. No. 4,565,857 was prepared in 35 g ethyl acetate (30% added, and the blend coated, cured in air, and evaluated as described in Example 1. The abrasion resistance value of the cured blend was 7.79% haze after abrasion.

Various modifications and alterations of this invention will become apparent to those skilled in the art without departing from the scope and spirit of this invention, and it should be understood that this invention is not to be unduly limited to the illustrative embodiments set forth herein.

I claim:

1. A condensation polymer comprising the reaction product of
   (1) diols, at least one of which is an acryloyloxyalkanediol or methacrylayloxyalkanediol of the formula

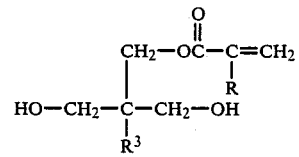

in which
R is hydrogen or methyl,
$R^3$ is

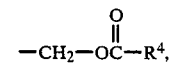

and $R^4$ is hydrogen or one or more of monovalent saturated or unsaturated linear, branched, or cyclic aliphatic groups having 1 to 24 carbon atoms, or aromatic groups having 6 to 18 carbon atoms, all of which can be optionally substituted by groups unreactive in esterification reactions, that is uncontaminated by hydroxyl group-containing compounds having one, three, or more hydroxyl groups and compounds in which the acryloyloxy and methacryloyloxy group is attached to a secondary carbon atom, and
   (2) an organic dicarboxylic acid halide, said reaction product being a linear polymer.

2. The condensation polymer according to claim 1 wherein said acryloyloxyalkandeiol and methacryloyloxyalkanediol is present in an amount in the range of 5 to 100 weight percent.

3. The condensation polymer according to claim 1 wherein said acryloyloxyalkaned and methacryloyloxyalkanediol is a 2-acryloyloxymethyl-1,3-propanediol or a 2-methacryloyloxymethyl-1,3-propanediol.

4. The condensation polymer according to claim 1 wherein said acryloyloxyalkanediol and methacryloyloxyalkanediol is selected from the group consisting of
2,2-bis(acryloyloxymethyl)-1-3-propanediol,
2-acryloyloxymethyl-1,3-propanediol
2-acryloyloxymethyl-2-methyl-1,3-propanediol
2-acryloyloxymethyl-2-ethyl-1,3-propanediol,
2,2-bis(methacryloyloxymethyl)-1,3-propanediol,
2-methacryloyloxymethyl-1,3-propanediol,
2-methacryloyloxymethyl-2-methyl-1,3-propanediol, and
2-methacryloyloxymethyl-2-ethyl-1,3-propanediol.

5. The condensation polymer according to claim 1 wherein said organic dicarboxylic acid halide is the diacid chloride or diacid bromide of succinic, glutaric, adipic, suberic, undecanedicarboxylic, phthalic, terephthalic, isophthalic, or hexadecanedicarboxylic acid, or dimerized fatty acid.

6. The condensation polymer according to claim 1 wherein said acid halide is substituted by a non-interfering group.

7. A composition of matter comprising the condensation polymer according to claim 1 further comprising an acryloyloxy or methacryloyloxy group-containing compound.

8. The crosslinked condensation polymer according to claim 1.

9. A condensation polymer having the formula:

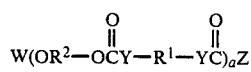

wherein
W and Z are terminal groups;
$R^1$ is one or more divalent organic groups;
Y is a covalent bond;
a is a number having a value 2 to 200;
$R^2$ is at least one divalent organic group which is the saturated or unsaturated residue provided by removal of two hydroxyl groups from (1) a polymeric diol selected from the group consisting of polyetherdiols, polyesterdiols, polyolefindiols, polyamidediols, polyurethanediols, and polysiloxanediols having a molecular weight of up to 15,000, (2) a monomeric diol which is a linear, branched, or cyclic aliphatic diol having 2 to 12 carbon atoms, (3) an aryl or alkaryldiol having 6 to 15 carbon atoms, or (4) at least one 1,3-propanediol represented by the formula:

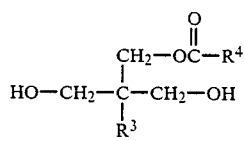

in which
$R^3$ is

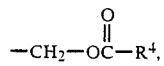

and
$R^4$ is one or more of hydrogen and monovalent saturated or unsaturated linear, branched, or cyclic aliphatic groups having 1 to 24 carbon atoms, or aromatic groups having 6 to 18 carbon atoms all of which can be optionally substituted by groups unreactive in esterification reactions;
provided that at least 5 weight percent of all diols is a 1,3-propanediol of formula II in which $R^4$ is —CH=CH₂ or

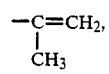

said 1,3-propanediol being uncontaminated by hydroxyl group-containing compounds having one, three, or more hydroxyl groups and compounds in which the acryloyloxy and methacryloyloxy group is attached to a secondary carbon atom, and said condensation polymer being a linear polymer.

10. The condensation polymer according to claim 9 wherein $R^1$ is a divalent aliphatic group having 2 to 40 carbon atoms or a divalent aromatic group having 5 to 24 carbon atoms.

11. A condensation polymer according to claim 9 in which Y is a covalent bond to provide a polyester.

12. A condensation polymer according to claim 9 wherein $R^1$ is substitutes by non-interfering groups selected from the group consisting of individual catenated, —O—,

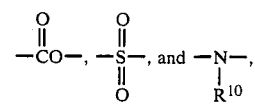

in which $R^{10}$ is lower alkyl of 1 to 4 carbon atoms.

13. A process for the preparation of an acryloyloxy and methacryloyloxy group-containing linear condensation polymer comprising the steps:
(a) providing a polymerization mixture of
(1) one or more of organic dicarboxylic acid hlides and
(2) one or more of polymeric and monomeric diols of which 5 to 100 percent by weight are diols represented by the formula:

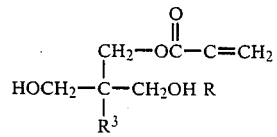

in which
R is hydrogen or methyl,
$R^3$ is

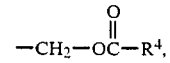

$R^4$ is one or more of hydrogen and monovalent saturated or unsaturated linear, branched, or cyclic aliphatic groups having 1 to 24 carbon atoms, or aromatic groups having 6 to 18 carbon atoms all of which can be optionally substituted by groups unreactive in esterification reactions;
provided that at least 5 weight percent of all diols is a 1,3-propanediol of formula II in which $R^4$ is —CH=CH₂ or

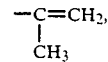

and said diol being uncontaminated by hydroxyl group-containing compounds having one, three, or more hydroxyl groups and compounds in which the acryloyloxy and methacryloyloxy group is attached to a secondary carbon atom,
(b) heating the polymerization mixture at an effective temperature for a time sufficient to effect polymerization.

14. The process according to claim 13 wherein said organic dicarboxylic acid halide of step (a)(1) is the diacid chloride or diacid bromide of succinic, glutaric, adipic, suberic, sebacic, undecanedicarboxylic, hexadecanedicarboxylic, phthalic, terephthalic, isophthalic acid, or dimerized fatty acid.

15. The process according to claim 13 wherein said acid halide of step (a)(1) is substituted by a non-interfering group.

16. The process according to claim 13 wherein said polymeric diol of step (a)(2) is selected from the group consisting of polyetherdiols, polyesterdiols, polyolefindiols, polyamidediols, polyurethanediols, and polysiloxanediols, and said monomeric diol is selected from aliphatic diols having 2 to 12 carbon atoms and aryl and alkaryl diols having 6 to 15 carbon atoms.

17. The process according to claim 13 wherein said polymerization mixture further comprises a molecular weight-controlling amount of monofunctional alcohol, on carboxylic acid halide.

18. The process according to claim 13 wherein said polymerization mixture further comprises an effective amount of at least one of a heat or radiation activated polymerization initiator, an organic solvent, a catalyst, a dye, a pigment, a fiber, a particle, or an organic polymer.

* * * * *

UNITED STATES PATENT AND TRADEMARK OFFICE
CERTIFICATE OF CORRECTION

PATENT NO. : 4,921,930

DATED : May 1, 1990

INVENTOR(S) : Gilbert C. Johnson

It is certified that error appears in the above-indentified patent and that said Letters Patent is hereby corrected as shown below:

Col. 2, line 37, "solvents The" should read -- solvents. The --.

Col. 2, line 50, "isocyanate The" should read -- isocyanate. The --.

Column 3, line 4, add "groups" at the end of line; and line 7, delete "group".

Col. 6, line 15, after "field" insert -- . --.

Col. 6, line 62, "07/099,565" should read -- 07/099,555 --.

Col. 9, line 8, after "2-butanoyloxymethyl-2-methyl-1,3-propanediol" insert -- 2-octanoyloxymethyl-2-ethyl-1,3-propanediol --.

Col. 11, line 62, "4,4,-bis(dimethylamino)benzopehnone" should read -- 4,4'-bis(dimethylamino)benzophenone --.

Col. 13, line 16 "RPC® UV" should read -- RPC™ UV --

Col. 14, line 59, in the heading of cols. (h) and (i) please insert -- *Abrasion Resistance in Samples Cured using 2 wt % photoinitiator --.

Col. 15, lines 2-5, in the heading of cols. (h) and (i) please insert -- *Abrasion Resistance in Samples Cured using 2 wt % photoinitiator --.

UNITED STATES PATENT AND TRADEMARK OFFICE
CERTIFICATE OF CORRECTION

PATENT NO. : 4,921,930
DATED : May 1, 1990
INVENTOR(S) : Gilbert C. Johnson

It is certified that error appears in the above-indentified patent and that said Letters Patent is hereby corrected as shown below:

Col. 16, line 45, "hearing" should read -- heating --.

Col. 17, line 61, after "30%" add -- solids), 0.3 g of the photoinitiator Irgacure™ 184 was --.

Col. 17, line 62, "the blend" should read -- then blend --.

Col. 18, line 63, after "suberic," add -- sebacic, --

Col. 20, line 4, "substitutes" should read -- substituted --.

Col. 20, line 19, "hlides" should read -- halides --.

Col. 20, lines 25-30, delete the formula and insert therefor --

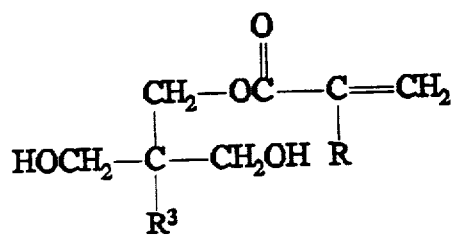

UNITED STATES PATENT AND TRADEMARK OFFICE
CERTIFICATE OF CORRECTION

PATENT NO. : 4,921,930

DATED : May 1, 1990

INVENTOR(S) : Gilbert C. Johnson

It is certified that error appears in the above-indentified patent and that said Letters Patent is hereby corrected as shown below:

Col. 22, line 4, "on" should read -- or --.

Signed and Sealed this

Twenty-fifth Day of October, 1994

Attest:

BRUCE LEHMAN

*Attesting Officer*  *Commissioner of Patents and Trademarks*